(12) United States Patent
Qahtani et al.

(10) Patent No.: US 11,708,839 B2
(45) Date of Patent: Jul. 25, 2023

(54) STUFFING BOX FOR VERTICAL PUMPS

(71) Applicant: SAUDI ARABIAN OIL COMPANY, Dhahran (SA)

(72) Inventors: Mohammad Qahtani, Abqaiq (SA); Andres E. Gonzalez, Abqaiq (SA); Muslim A. Alzayer, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/456,428

(22) Filed: Nov. 24, 2021

(65) Prior Publication Data
US 2023/0160393 A1 May 25, 2023

(51) Int. Cl.
| | |
|---|---|
| F04D 29/10 | (2006.01) |
| F04D 29/046 | (2006.01) |
| F04D 13/06 | (2006.01) |
| F16J 15/18 | (2006.01) |
| F16J 15/44 | (2006.01) |
| E21B 33/03 | (2006.01) |
| E21B 43/12 | (2006.01) |

(52) U.S. Cl.
CPC ........... *F04D 29/106* (2013.01); *F04D 13/06* (2013.01); *F04D 29/046* (2013.01); *F16J 15/182* (2013.01); *F16J 15/441* (2013.01); *E21B 33/03* (2013.01); *E21B 43/128* (2013.01)

(58) Field of Classification Search
CPC ........ F04D 13/06; F04D 13/10; F04D 29/007; F04D 29/046; F04D 29/08–146; F16J 15/18–445
See application file for complete search history.

(56) References Cited

U.S. PATENT DOCUMENTS

| | | | | |
|---|---|---|---|---|
| 2,824,759 | A * | 2/1958 | Tracy | F04D 29/128 277/408 |
| 3,474,734 | A * | 10/1969 | Stogner | F04D 29/106 415/230 |
| 5,024,453 | A * | 6/1991 | Suggs | F16K 41/02 277/516 |
| 5,316,319 | A * | 5/1994 | Suggs | F04D 29/102 411/917 |
| 5,709,514 | A * | 1/1998 | Suggs | F16B 31/04 411/231 |

FOREIGN PATENT DOCUMENTS

SE          466361 B  *  2/1992  ........... F04D 29/106

* cited by examiner

*Primary Examiner* — Brian P Wolcott
(74) *Attorney, Agent, or Firm* — Osha Bergman Watanabe & Burton LLP

(57) ABSTRACT

A stuffing box for sealing a top opening of a vertical pump, including: a housing with a vertical tube for rotatably disposing a shaft of the vertical pump, an annular bearing that: divides the vertical tube in a lower half and an upper half, and fills an annular space between an inner wall of the vertical tube and the shaft, such that as less fluid as possible passes from the lower half through the annular bearing to the upper half, an outlet pipe for discharging the fluid passing through the annular bearing.

8 Claims, 3 Drawing Sheets

STUFFING BOX FOR VERTICAL PUMPS

BACKGROUND

Vertical pumps are a type of centrifugal pump designed to move a fluid from a well or reservoir to an upper position. Vertical pumps comprise a bottom opening or suction bell where the liquid enters that is located at the lower side of the pump and a discharge which is located at the upper side of the pump where the fluid is discharged at higher pressure. Vertical pumps further comprise a driver which is usually an electric motor that is connected to the vertical pump shaft to transmit the torque to the impeller(s). Once the driver is turned on, the impeller rotates and moves the fluid from the bottom opening to the top opening.

The electric motor is located outside the vertical pump, whereas the impeller is located inside the vertical pump. The shaft is rotatably disposed in a top opening of the housing wall of the vertical pump. Therefore, the annular space between the shaft and the top opening of the housing wall needs to be sealed in a manner that the shaft is still rotatable.

Packing seals are used to seal the shaft against the top opening of the housing wall. Packing seals have a low cost, however, packing seals can cause premature wear on the shaft which can lead to a complete overhaul of the vertical pump. Packing seals require frequent adjustment to compensate the wear of the materials used in the packing seal. On average, a bi-weekly adjustment is performed by a technician. If the packing seal is adjusted excessively, the packing seal reaches high temperatures resulting in damages to the shaft.

Accordingly, there exists a need for a low maintenance sealing of the shaft against the top opening of the vertical pump.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect the claimed subject matter relates to a stuffing box for sealing a top opening of a vertical pump, comprising: a housing with a vertical tube for rotatably disposing a shaft of the vertical pump, an annular bearing that: divides the vertical tube in a lower half and an upper half, and fills an annular space between an inner wall of the vertical tube and the shaft, such that as less fluid as possible passes from the lower half through the annular bearing to the upper half, an outlet pipe for discharging the fluid passing through the annular bearing.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In one aspect, embodiments disclosed herein relate to a stuffing box for sealing a top opening of a vertical pump. The stuffing box has a housing with a vertical tube for rotatably disposing a shaft of the vertical pump, an annular bearing that divides the vertical tube in a lower half and an upper half, and fills an annular space between an inner wall of the vertical tube and the shaft, such that as less fluid as possible passes from the lower half through the annular bearing to the upper half. In addition, the stuffing box has an outlet pipe for discharging the fluid passing through the annular bearing. In one or more embodiments, the stuffing box is a self-adjusted, force cooled, leak-proof seal packing.

Embodiments of the present disclosure may provide at least one of the following advantages.

The stuffing box provides a continuous flushing for lubrication of the bearing with the fluid and at the same time provides an outlet pipe to discharge the fluid. This reduces the pressure by fluid release, which reduces the leakage to a minimum. Furthermore, the stuffing box provides a higher reliability and low maintenance cost on a pumping application. The maintenance and replacement of parts is performed without removing the stuffing box from the top opening of the vertical pump. Advantageously, due to its simplicity, the stuffing box may be implemented on any pumping application and its dimensions can be customized to every design.

In one or more embodiments, the stuffing box is a hybrid design between a conventional pump packing and a mechanical seal. The stuffing box provides a combination of both seals for higher reliability and low maintenance cost on pumping applications.

Figure 1:
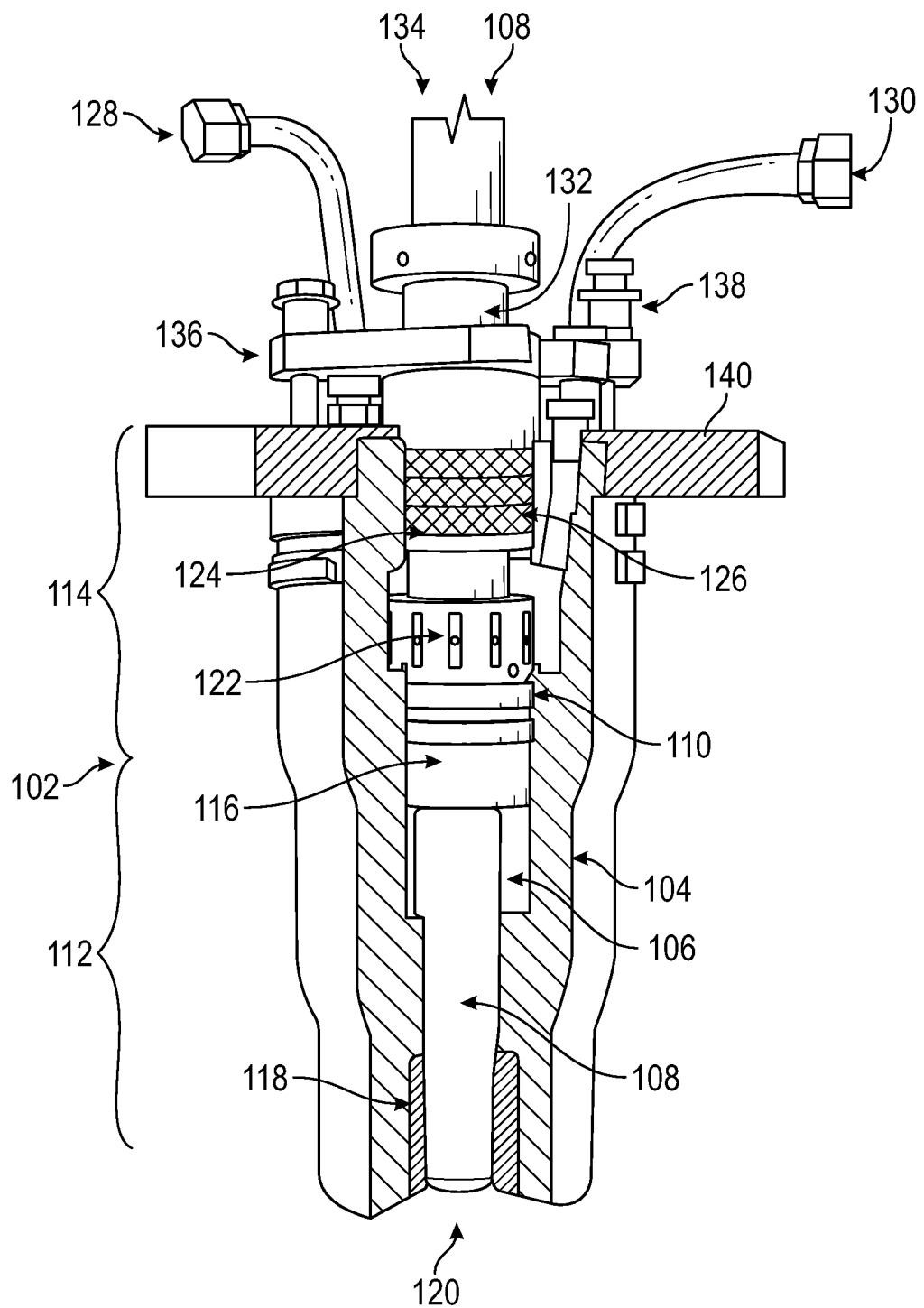
FIG. 1 shows a cross-sectional view of a stuffing box, according to one or more embodiments disclosed herein.

FIG. 1 shows a cross-sectional view of a stuffing box 102, according to one or more embodiments. The stuffing box 102 comprises an annular housing 104 with a vertical tube 106 going through the housing 4. The housing 104 comprises stainless steel. A shaft 108 of a vertical pump is rotatably disposed through the vertical tube 106. An annular bearing 110 divides the vertical tube 106 in a lower half 112 and an upper half 114, where the lower half 112 is filled with a fluid once the vertical pump starts pumping the fluid.

Turning to the lower half 112, an annular bushing 116 is disposed below the annular bearing 110 surrounding the shaft 108. The annular bushing 116 reduces the pressure of the fluid in the lower half 112 towards the annular bearing 110. An annular sleeve bearing 118 is disposed at a lower opening 120 of the housing 104.

Turning to the upper half 114, an annular pumping ring 122 is disposed above the annular bearing 110. Above the pumping ring 122, an annular floating seal 124 is disposed around the shaft 108. Above the floating seal 124, an annular packing seal 126 surrounds the shaft 108.

The packing seal 126 further reduces or even eliminates the leakage of the fluid from the housing 104. The number of sealing elements in the stuffing box 102 is reduced to a minimum, namely 3 elements. These elements are the annular packing seal 126, the floating seal 124, and the annular bushing 116. Compared to prior art designs, which usually comprise 10 sealing elements, the heat generation, caused by the friction between the annular bearing 110 and the moving shaft 108, is minimal.

The stuffing box 102 further comprises an inlet pipe 128 and an outlet pipe 130. The inlet and outlet pipe 128, 130 connect the upper half 114 with an outside of the stuffing box 102. A shaft sleeve 132 is disposed at an upper opening 134 of the housing 104. Furthermore, the housing 104 comprises a flange 140 for attaching the stuffing box 102 to the top opening of the vertical pump. In one or more embodiments, the flange 140 is integrally formed with the housing as one piece. A gland pusher 136 is pushed against the flange 140 by four springs 138 that continuously adjust the gland pusher 136 against the flange 140 and the annular packing seal 126. The springs 138 are self-adjusting. The self-adjusted springs 138 compensate the wear of the packing and provide a continuous adjustment through the spring force towards the flange 136. The self-adjustment mechanism of the springs 138 requires no human intervention as a short frequency.

Once the vertical pump begins turning the shaft 108, the impeller of the vertical pump pumps the fluid through the vertical pump generating an overpressure at the lower half 112. The overpressure presses the fluid from the lower half 112 through the annular bearing 110 to the upper half 114. The fluid is then discharged from the upper half 114 through the outlet pipe 130 to a sump pit by the pumping ring 122. The fluid flushes and lubricates the annular bearing 110 while passing through the annular bearing 110.

In one or more embodiments, a clean fluid (if needed) is injected into the upper half 114 through the inlet 128, in case the fluid from the lower half 112 is dirty. The clean and dirty fluid mix in the upper half 114 and discharge through the outlet pipe 130.

The floating seal 124 regulates the fluid to be discharged through the outlet pipe 130 and the fluid to be injected through the inlet pipe 128. The pumping ring 122 uses the power of the shaft 108 for regulating the quantity of fluid for lubrication of the mechanical seal components. In this way, the annular bearing 110 is continuously flushed and lubricated.

Since the fluid in the upper half 114 has a much lower pressure than the fluid in the lower half 112, the fluid in the upper half 114 does not have enough pressure to press out of the housing 104 through the floating seal 124 and the packing seal 126. Reducing the pressure of the fluid minimizes the leakage of the fluid from the upper half 114 and thus from the housing 104 of the stuffing box 102.

The clean fluid is used under dirty process conditions. The clean fluid prevents scale or solidifications inside the stuffing box which will reduce the life of the packing seal 126.

Figure 2:
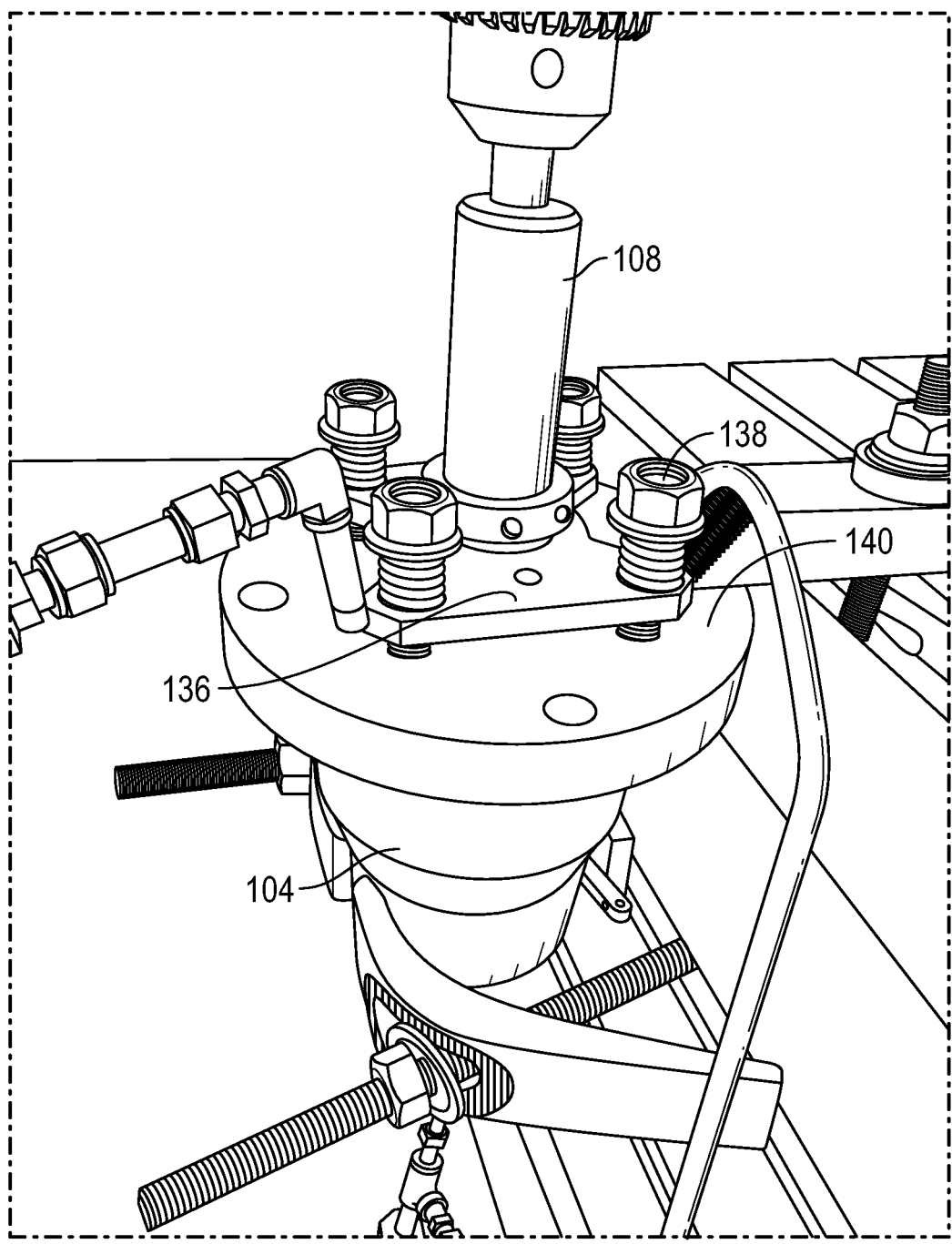
FIG. 2 shows a top view of the stuffing box according to FIG. 1 during a functionality test using an external water source.

FIG. 2 shows a top view of the stuffing box according to FIG. 1 during a full functionality test by using an external water source and a power tool, which is a drilling machine used to simulate an electric motor, wherein the power tool rotates the shaft 108. The functionality test needs to be performed at a shop before the stuffing box is installed at a field.

The four springs 138 push the gland pusher 136 against the flange 140 of the housing 104 and the packing arrangement is compressed with a continuous force for a prolonged time period, reducing the maintenance of frequent adjustments of the packing arrangement.

The functionality test was performed at a site on a vertical pump with a top opening sealed with the stuffing box. The vertical pump was pumping water from the external water source and only minor leakage occurred through the stuffing box. This leakage was fully eliminated by increasing the tension of the springs 138 on the gland pusher.

Figure 3:
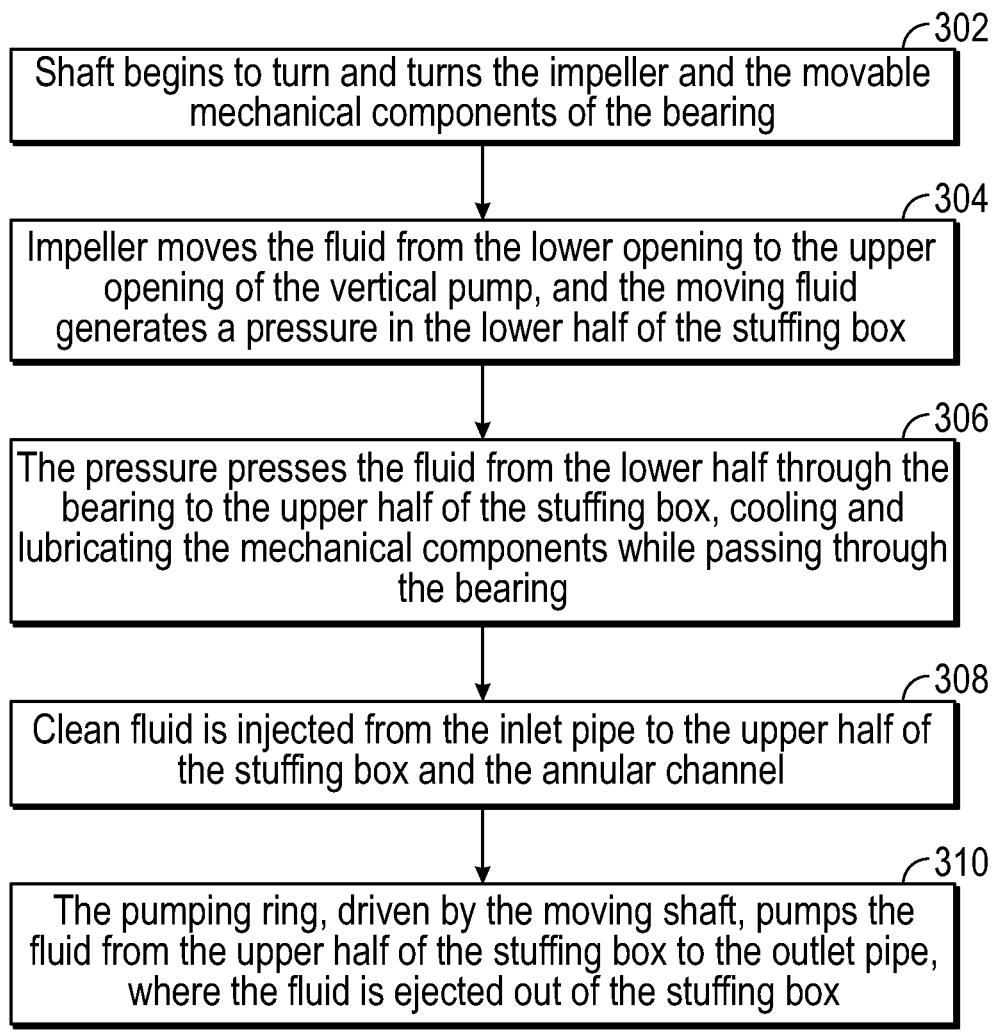
FIG. 3 shows a flow chart of the initial operation of the vertical pump using the stuffing box to seal the top opening of the vertical pump according to FIG. 1.

FIG. 3 shows a flowchart of the initial operation of the vertical pump using the stuffing box to seal the top opening of the vertical pump according to FIG. 1. The initial operation of the vertical pump begins with the first step 302, which is the initial turning of the shaft by the electric motor of the vertical pump. The turning of the shaft turns the impeller and the movable mechanical components of the bearing.

In step 304, the turning impeller of the vertical pump moves a fluid from the lower opening to the upper opening of the vertical pump and the moving fluid generates a pressure in the lower half of the stuffing box.

In step 306, the pressure presses the fluid from the lower half through the bearing to the upper half of the stuffing box. The fluid passing through the bearing cools and lubricates the mechanical components of the bearing.

In step 308, clean fluid is injected from the inlet pipe to the upper half of the stuffing box and the annular chamber 210. The clean fluid mixes with the fluid passing from the lower half through the bearing. The clean fluid cleans the bearing in case the fluid from the lower half is dirty.

In step 310, the pumping ring pumps the mixed fluid from the upper half of the stuffing box to the outlet pipe, where the fluid is ejected out of the stuffing box. The pumping ring is driven by the moving shaft. In one or more embodiments, the ejected fluid is returned to the fluid being pumped by the vertical pump. In other embodiments, the ejected fluid is disposed.

The operation of the vertical pump according to the method steps 302-310 is a continuous operation and continues as long as the vertical pump pumps the fluid. The fluid passes constantly through the bearing during the operation of the vertical pump and the pumping ring constantly pumps the fluid out of the outlet pipe. This constant operation of the of the vertical pump according to the method steps 302-310 keeps the bearing and its mechanical seal components lubricated during the pumping of the fluid by vertical pumps.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A stuffing box for sealing a top opening of a vertical pump, comprising:
    a housing with a vertical tube for rotatably disposing a shaft of the vertical pump, the vertical tube having a lower half and an upper half, wherein a pressure of fluid in the upper half is lower than a pressure of fluid in the lower half;

an annular bearing surrounding the shaft and dividing the lower half of the vertical tube from the upper half of the vertical tube; and an outlet pipe for discharging the fluid passing through the annular bearing, wherein the lower half of the vertical tube comprises:

an annular bushing, disposed below the annular bearing, for reducing the pressure of the fluid towards the annular bearing; and an annular sleeve bearing, positioned below the annular bushing, disposed at a lower opening of the housing;

wherein the upper half of the vertical tube comprises:

a pumping ring, disposed directly above the annual bearing, for pumping the fluid passing through the annular bearing through the outlet pipe;

an annular floating seal, disposed above the pumping ring, for regulating flow of the fluid to the outlet pipe;

an annular packing seal, disposed directly above the annular floating seal, for sealing the upper half of the vertical tube.

2. The stuffing box according to claim 1, wherein the pumping ring is driven by the shaft.

3. The stuffing box according to claim 1, further comprising an inlet pipe that injects a clean fluid into the upper half that flushes the fluid passing through the annular bearing to the outlet pipe.

4. The stuffing box according to claim 1, wherein the annular bearing comprises a ball bearing.

5. The stuffing box according to claim 1, wherein the housing comprises an annular chamber that connects a space in and around the annular bearing with the upper half of the vertical tube for lubricating the annular bearing with the fluid.

6. The stuffing box according to claim 1, further comprising a flange for attaching the stuffing box to the vertical pump.

7. The stuffing box according to claim 1, further comprising a gland pusher that pushes against the flange by self-adjusting springs.

8. The stuffing box according to claim 1, wherein the housing comprises stainless steel.

* * * * *